(12) United States Patent
Griffiths

(10) Patent No.: US 8,708,344 B2
(45) Date of Patent: Apr. 29, 2014

(54) SEALED ASSEMBLIES AND METHODS OF UNSEALING SAME

(71) Applicant: GM Global Technology Operations LLC, Detroit, MI (US)

(72) Inventor: Leonard Barry Griffiths, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/633,188

(22) Filed: Oct. 2, 2012

(65) Prior Publication Data

US 2014/0091528 A1    Apr. 3, 2014

(51) Int. Cl.
*F02F 11/00* (2006.01)
*F16J 15/02* (2006.01)

(52) U.S. Cl.
USPC .......................................... 277/598; 277/637

(58) Field of Classification Search
USPC ......... 277/590, 591, 598, 313, 917, 317, 626, 277/627, 650, 651, 652, 653, 654
See application file for complete search history.

(56) References Cited

U.S. PATENT DOCUMENTS

| | | | | |
|---|---|---|---|---|
| 3,799,389 | A * | 3/1974 | Bloeck | 220/279 |
| 4,650,079 | A * | 3/1987 | Tani | 383/206 |
| 4,795,035 | A * | 1/1989 | Kim | 229/310 |
| 2005/0220377 | A1 * | 10/2005 | Hanus | 383/206 |
| 2006/0065222 | A1 | 3/2006 | Neal | |

* cited by examiner

*Primary Examiner* — Vishal Patel
*Assistant Examiner* — L. Susmitha Koneru
(74) *Attorney, Agent, or Firm* — Quinn Law Group, PLLC

(57) ABSTRACT

A sealed assembly includes a first component having a first flange, and a second component having a second flange matable with the first flange. The sealed assembly also includes a sealant disposed between and along the first flange and the second flange such that the first component is sealingly mated to the second component. The sealed assembly further includes a wire disposed within the sealant, wherein the wire is configured for unsealing the second component from the first component. A method of unsealing the sealed assembly is also disclosed.

12 Claims, 2 Drawing Sheets

SEALED ASSEMBLIES AND METHODS OF UNSEALING SAME

TECHNICAL FIELD

The disclosure relates to a sealed assembly and to a method of unsealing the sealed assembly.

BACKGROUND

Fluids are often contained within a cavity defined by two separable components. For example, for automotive applications, a first component, such as an engine block, and a second component that is separable from the first component, such as an oil pan, may be mated together to define a cavity configured for holding oil. Often, such components are sealed to one another with a sealant to prevent fluid loss from the cavity during vehicle operation.

SUMMARY

A sealed assembly includes a first component having a first flange, and a second component having a second flange matable with the first flange. The sealed assembly also includes a sealant disposed between and along the first flange and the second flange such that the first component is sealingly mated to the second component. Further, the sealed assembly includes a wire disposed within the sealant, wherein the wire is configured for unsealing the second component from the first component.

In one embodiment, the first component is formed from a first material, and the second component is formed from a second material that is different from the first material. Further, the second flange has an inner edge and an outer edge spaced apart from the inner edge. The sealed assembly also includes a room-temperature vulcanized sealant disposed between and along the first flange and the second flange such that the first component is sealingly mated to the second component. The wire is disposed within the room-temperature vulcanized sealant along an entire perimeter of the second flange, and the wire spaces the first component apart from the second component. The wire includes a handle configured for pulling the wire through the room-temperature vulcanized sealant and extends from the second flange past the outer edge. The sealed assembly further includes a plurality of fasteners configured for attaching the second flange to the first flange and disposed between the inner edge and the outer edge. The wire at least partially surrounds each of the plurality of fasteners and is disposed between the outer edge and each of the plurality of fasteners. Further, the room-temperature vulcanized sealant is severable by the wire so that the first component unseals from the second component.

A method of unsealing a sealed assembly includes applying a sealant composition onto a wire, wherein the wire is disposed between and along a first flange of a first component and a second flange of a second component. After applying, the method includes curing the sealant composition to form a sealant between the first component and the second component such that the second component is mated to the first component to thereby form the sealed assembly. After curing, the method includes pulling the wire through the sealant to sever the sealant and thereby unseal the sealed assembly.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Figure 1:
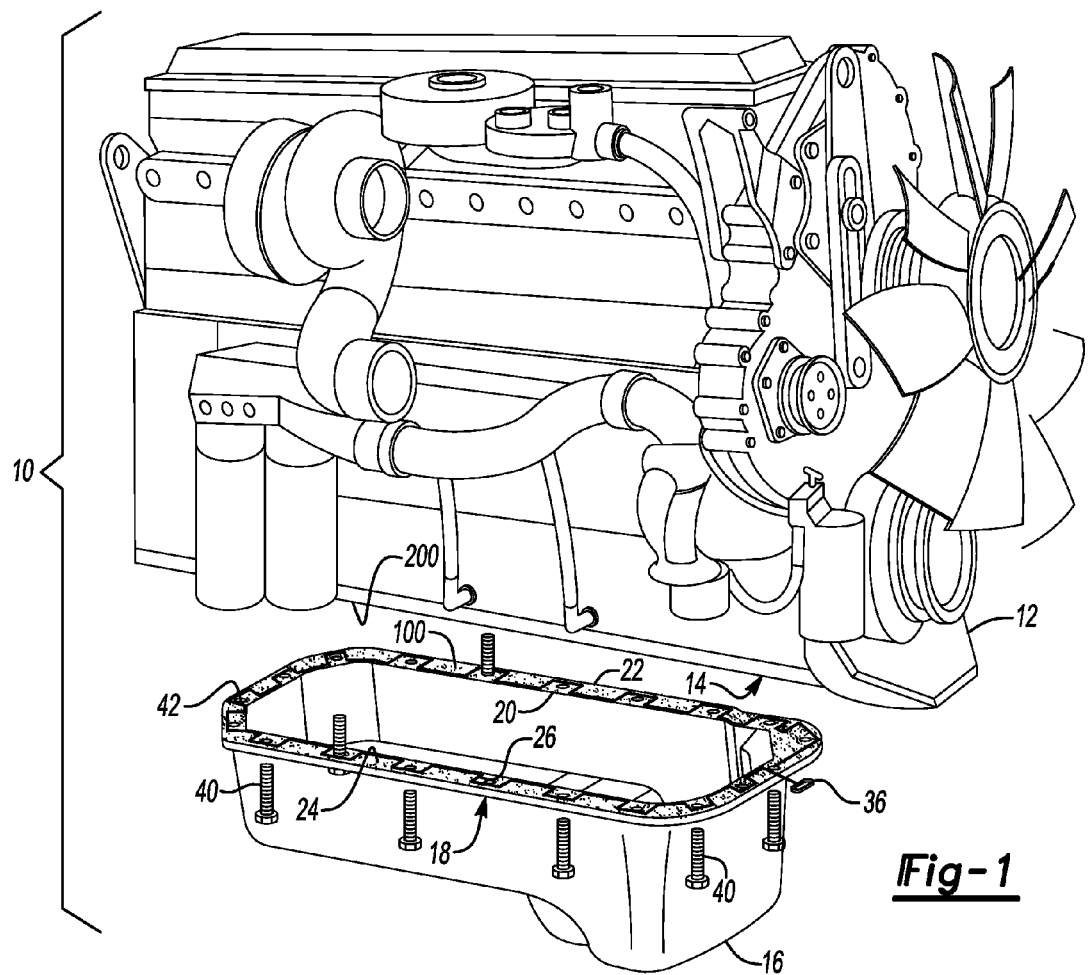
FIG. 1 is a schematic perspective exploded illustration of a sealed assembly including a first component, a second component, and a wire disposed therebetween.

Referring to the Figures, wherein like reference numerals refer to like elements, an exploded view of a sealed assembly is shown generally at 10 in FIG. 1. The sealed assembly 10 may be useful for vehicles, such as automotive vehicles, that may require containment of fluids within a sealed cavity. However, the sealed assembly 10 may also be useful for non-automotive applications including, for example, marine, household, and aviation applications wherein any fluid may be contained within the sealed cavity.

As shown in FIG. 1, the sealed assembly 10 includes a first component 12 having a first flange 14. For example, for automotive applications, the first component 12 may be an engine block of an internal combustion engine (shown in FIG. 1), and the first flange 14 may extend perpendicularly from the first component 12 and be configured for attachment to a second component 16, as set forth in more detail below. For non-automotive applications, the first component 12 may be a bathtub (not shown) or window frame (not shown). Further, the first flange 14 may have a first sealing surface 100 that is configured for sealing to the second component 16. The first component 12 may be formed from a first material, such as, but not limited to, a metal. By way of a non-limiting example, the first material may be aluminum.

With continued reference to FIG. 1, the sealed assembly 10 also includes the second component 16 having a second flange 18 matable with the first flange 14. For example, for automotive applications, the second component 16 may be an oil pan (shown in FIG. 1), a rear engine cover (not shown), or any other element configured for attachment to the first component 12. For non-automotive applications, the second component 16 may be, for example, a pane of glass (not shown) matable to the first component 12, e.g., the bathtub (not shown) or window frame (not shown). The second flange 18 may also extend perpendicularly from the second component 16, and may be configured for attaching to the first flange 14, as set forth in more detail below. In particular, the second flange 18 may have a second sealing surface 200 that is configured for sealing to the first sealing surface 100. In addition, the second flange 18 may have an inner edge 20 and an outer edge 22 spaced apart from the inner edge 20.

With continued reference to FIG. 1, the second component 16 may be formed from a second material that is different from the first material. Therefore, the first component 12 and the second component 16 may be formed from different materials so that the sealed assembly 10 is a composite part. Alternatively, the second material may be the same as the first material. Suitable second materials include, but are not limited to, polymers such as polyamides, e.g., nylon, and metals, such as aluminum. Therefore, in one non-limiting example, the sealed assembly 10 may include an aluminum engine block, i.e., the first component 12, and a nylon oil pan, i.e., the second component 16.

Figure 2:
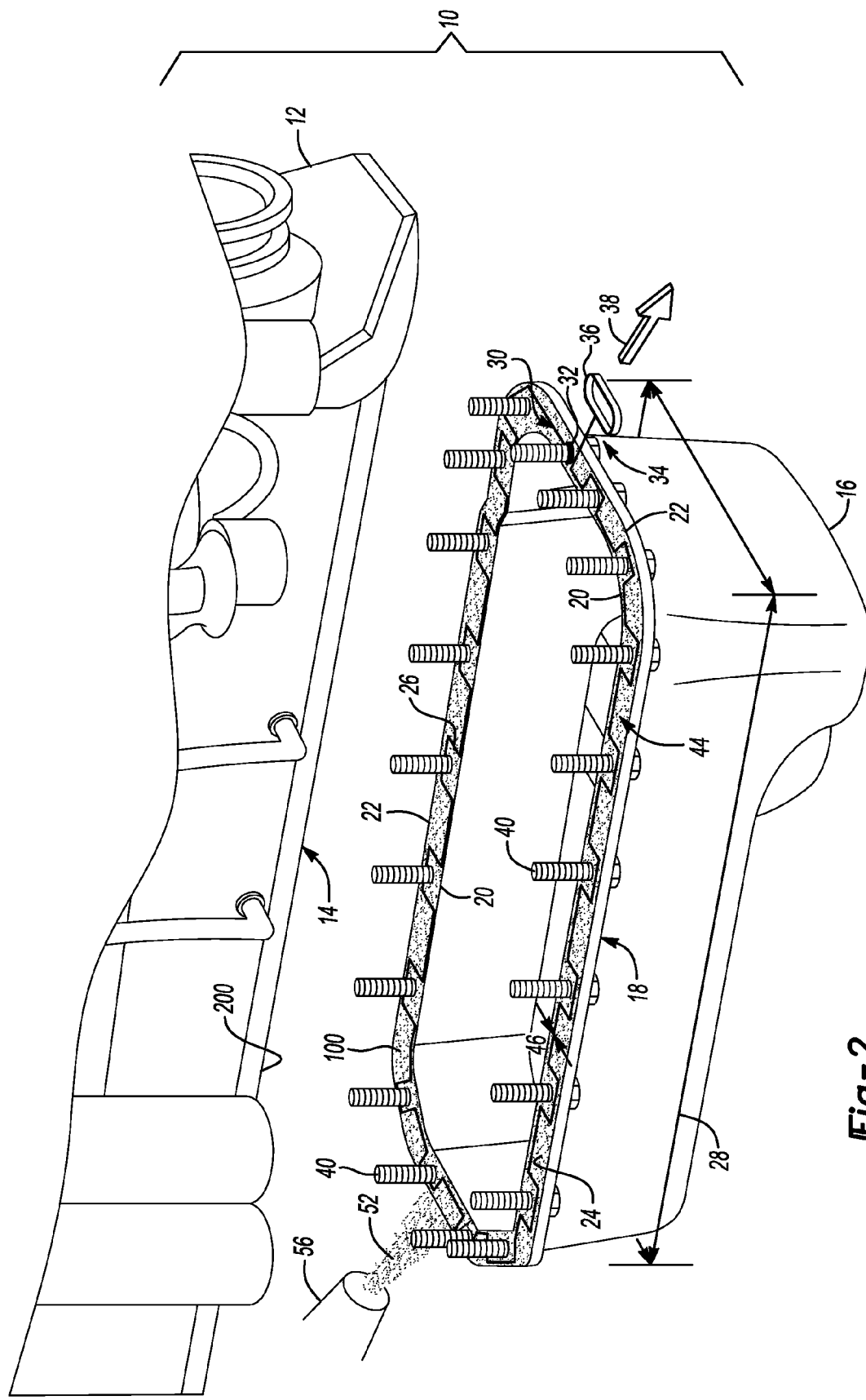
FIG. 2 is a schematic perspective exploded illustration of a partial view of the first component and the second component of FIG. 1, wherein the wire is disposed on the second component.

Referring now to FIG. 2 wherein the sealed assembly 10 is also shown in an exploded view, the sealed assembly 10 further includes a sealant 24 disposed between and along the first flange 14 and the second flange 18 such that the first component 12 is sealingly mated to the second component 16. The sealant 24 may be selected from any suitable sealant, such as, but not limited to room-temperature vulcanized sealants and silicone sealants. As used herein, the terminology "room-temperature vulcanized sealant" refers to a two-component material system, e.g., including a base component and a curing agent reactive with the base component, that is cured at ambient temperature, and generally applied to components 12, 16 in fluid form. Such material systems have comparatively short set-up or cure times and generally cure within minutes. A fully cured room-temperature vulcanized sealant 24 may provide a fluid-tight seal between the first component 12 and the second component 16. A suitable example of the room-temperature vulcanized sealant 24 is room-temperature vulcanized silicone rubber.

With continued reference to FIG. 2, the sealed assembly 10 further includes a wire 26 disposed within the sealant 24, wherein the wire 26 is configured for unsealing the second component 16 from the first component 12. That is, as set forth in more detail below, the wire 26 may aid in disassembly of the second component 16 from the first component 12 during, for example, maintenance operations of the sealed assembly 10.

As best shown in FIG. 2, the wire 26 may be disposed along a perimeter 28 of the second flange 18. That is, the wire 26 may circumscribe the second component 16 along the second flange 18, and may therefore also circumscribe the first component 12 along the first flange 14 when the first component 12 is mated to the second component 16. More specifically, the wire 26 may have a first end 30 including an anchor 32, and a second end 34 spaced opposite the first end 30. The second end 34 may include a handle 36 configured for pulling 60 (FIG. 3) the wire 26 through the sealant 24 and extending from the second flange 18 past the outer edge 22. Therefore, as set forth in more detail below, the wire 26 may sever, e.g., slice through, the sealant 24 when the handle 36 is pulled in a direction (represented generally by arrow 38 in FIG. 2) substantially parallel to the first sealing surface 100 and the second sealing surface 200.

For example, with continued reference to FIG. 2, the sealed assembly 10 may further include a plurality of fasteners 40 configured for attaching the second flange 18 to the first flange 14. The plurality of fasteners 40 may be, by way of non-limiting examples, bolts, screws, and the like. Further, as best shown in FIG. 1, the second flange 18 and the first flange 14 may define a plurality of holes 42 therein each configured for receiving a respective one of the plurality of fasteners 40. Therefore, when fastened, each of the plurality of fasteners 40 may extend through a respective one of the plurality of holes 42 defined by the first flange 14 and the second flange 18 to thereby attach the second flange 18 to the first flange 14.

As best shown in FIG. 2, the anchor 32 may be attached to or surround one of the plurality of fasteners 40, and the wire 26 may be disposed adjacent to the plurality of fasteners 40 along the second flange 18. That is, the anchor 32 may be configured as a ring, and one of the plurality of fasteners 40 may extend through the anchor 32 to thereby attach the first end 30 of the wire 26 to the fastener 40. More specifically, each of the plurality of fasteners 40 may be disposed between the inner edge 20 and the outer edge 22. Further, the wire 26 may at least partially surround, e.g., may be bent around, each of the plurality of fasteners 40 and may be disposed between the outer edge 22 and each of the plurality of fasteners 40.

That is, as described with reference to FIG. 2 and as set forth in more detail below, the wire 26 may be bent, e.g., into a rigid, bent configuration (shown generally at 44 in FIG. 2), to have a shape congruent with the second flange 18. Therefore, the wire 26 may be placed onto the second flange 18 in the rigid, bent configuration 44 in preparation for forming the sealed assembly 10. As such, the wire 26 may space the first component 12 apart from the second component 16. That is, as assembled, the wire 26 may be disposed within the sealant 24, and may be sandwiched between the first component 12 and the second component 16 along the first flange 14 and the second flange 18.

The wire 26 may be selected from any material suitable for bending and retaining the rigid, bent configuration 44. For example, the wire 26 may be steel wire and may have a thickness 46 of from about 0.3 mm to about 0.7 mm, e.g., about 0.5 mm.

Referring again to FIG. 2, in operation, the sealant 24 may be severable by the wire 26 so that the first component 12 unseals from the second component 16. For example, the sealant 24 may be partially- or fully-severable by the wire 26. Stated differently, the wire 26 may partially slice or completely slice through the sealant 24 to unseal the first component 12 from the second component 16. That is, an operator or machine may pull on the handle 36 of the wire 26 and translate the wire 26 in the direction 38 substantially parallel to the first sealing surface 100 and the second sealing surface 200 so that the wire 26 slices through and severs the sealant 24, unseals the second component 16 from the first component 12, and thereby separates the second component 16 from the first component 12. Beneficially, the wire 26 may sever the sealant 24 without damaging, e.g., fracturing, marring, and/or bending, the first flange 14 and the second flange 18. Therefore, upon the completion of maintenance operations, the second component 16 may be re-matable to the first component 12 after the wire 26 severs the sealant 24.

Figure 3:
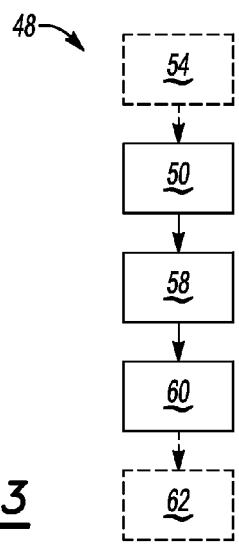
FIG. 3 is a schematic flowchart of a method of unsealing the sealed assembly of FIGS. 1 and 2.

Referring now to FIG. 3, a method 48 of unsealing the sealed assembly 10 (FIG. 1) is set forth herein. The method 48 may be useful for disassembling the second component 16 (FIG. 1) from the first component 12 (FIG. 1), e.g., during maintenance operations of the sealed assembly 10.

As described with reference to FIG. 2, the method 48 (FIG. 3) includes applying 50 (FIG. 3) a sealant composition 52 onto the wire 26, wherein the wire 26 is disposed between and along the first flange 14 of the first component 12 and the second flange 18 of the second component 16. Suitable non-limiting examples of the sealant composition 52 include room-temperature vulcanizable sealant compositions and silicone sealant compositions. In one example, the sealant composition 52 is a room-temperature vulcanizable sealant composition 52. Prior to applying 50, the method 48 may include preforming 54 (FIG. 3) the wire 26 into the rigid, bent configuration 44 having the shape congruent with the second flange 18. Then, after preforming 54, the wire 26 may be placed onto the second flange 18.

Further, as best shown in FIG. 2, concurrent to or after the wire 26 is placed onto the second flange 18, each of the plurality of fasteners 40 may be inserted into a respective one of the plurality of holes 42 (FIG. 1) defined by the first flange 14 and second flange 18 to thereby fasten the second component 16 to the first component 12. Subsequently, the sealant composition 52 may be applied onto the wire 26 so as to surround the wire 26 along the second flange 18. The sealant composition 52 may be applied in any suitable manner, such as, but not limited to, applying 50 (FIG. 3) the sealant composition 52 through a nozzle (shown generally at 56 in FIG. 2).

Referring again to FIG. 2, after applying 50 (FIG. 3), the method 48 (FIG. 3) includes curing 58 (FIG. 3) the sealant composition 52 to form the sealant 24 between the first component 12 and the second component 16 such that the second component 16 is mated to the first component 12 to thereby form the sealed assembly 10. Curing 58 may include exposing the sealant composition 52 to ambient temperature for a curing duration, e.g., for from about 1 minute to about 10 minutes. As such, curing 58 may sealingly mate the first flange 14 to the second flange 18 and, in conjunction with the plurality of fasteners 40, may form a fluid-tight seal between the first component 12 and the second component 16.

With continued reference to FIG. 2, the method 48 (FIG. 3) also includes, after curing 58 (FIG. 3), pulling 60 (FIG. 3) the wire 26 through the sealant 24 to sever the sealant 24 and thereby unseal the sealed assembly 10. As set forth above, pulling 60 may translate the wire 26 in the direction 38 substantially parallel to the first sealing surface 100 and the second sealing surface 200. For example, pulling 60 may include translating the wire 26 by hand to thereby sever the sealant 24. That is, during repair operations wherein it is desirable to separate the first component 12 and the second component 16 from one another, an operator may pull the handle 36 to thereby slice the wire 26 through the sealant 24 to unseal the sealed assembly 10. Subsequently, the plurality of fasteners 40 may be unfastened so that the second component 16 may be removed from the first component 12. Therefore, pulling 60 may include protecting the first flange 14 and the second flange 18 from damage from, e.g., fracture, marring, and/or bending.

As such, with continued reference to FIG. 2, the method 48 (FIG. 3) may also include, after pulling 60 (FIG. 3), reforming 62 (FIG. 3) the sealed assembly 10. For example, after the conclusion of maintenance operations, an additional wire (not shown) may be again placed onto the second flange 18, the sealant composition 52 may be applied onto the wire 26, and the second flange 18 may be sealingly mated to the first flange 14 by abutting the first component 12 and the second component 16 and fastening the plurality of fasteners 40.

The sealed assembly 10 (FIGS. 1 and 2) and method 48 (FIG. 3) allow for simple and efficient separation of the first component 12 (FIGS. 1 and 2) and the second component 16 (FIGS. 1 and 2) without damaging the first flange 14 (FIGS. 1 and 2) or the second flange 18 (FIGS. 1 and 2). Further, the sealed assembly 10 and method 48 are especially suitable for applications requiring first components 12 and second components 16 formed from different materials. That is, the sealed assembly 10 and method 48 minimize breakage and/or damage of components 12, 16 during disassembly of the sealed assembly 10. Therefore, the sealed assembly 10 and method 48 allow for efficient re-assembly of the sealed assembly 10 after the first component 12 is unsealed from the second component 16.

While the best modes for carrying out the disclosure have been described in detail, those familiar with the art to which this disclosure relates will recognize various alternative designs and embodiments for practicing the disclosure within the scope of the appended claims.

The invention claimed is:

1. A sealed assembly comprising:
a first component having a first flange; a second component having a second flange matable with the first flange;
a sealant disposed between and along the first flange and the second flange such that the first component is sealingly mated to the second component;
a wire disposed within the sealant and along a perimeter of the second flange, wherein the wire is configured for unsealing the second component from the first component;
a plurality of fasteners configured for attaching the second flange to the first flange, wherein the second flange and the first flange define a plurality of holes therein each configured for receiving a respective one of the plurality of fasteners;
and wherein the wire is adjacent to the plurality of fasteners along the second flange.

2. The sealed assembly of claim 1, wherein the first component is formed from a first material and the second component is formed from a second material that is different from the first material.

3. The sealed assembly of claim 1, wherein the wire has:
a first end including an anchor; and
a second end spaced opposite the first end and including a handle configured for pulling the wire through the sealant.

4. The sealed assembly of claim 3, wherein the first flange has a first sealing surface and the second flange has a second sealing surface configured for sealing to the first sealing surface, and further wherein the wire severs the sealant when the handle is pulled in a direction substantially parallel to the first sealing surface and the second sealing surface.

5. The sealed assembly of claim 1, wherein the anchor is attached to one of the plurality of fasteners, and further wherein the wire is disposed adjacent to the plurality of fasteners along the second flange.

6. A sealed assembly comprising:
a first component having a first flange;
a second component having a second flange matable with the first flange;
wherein the first component is formed from a first material and the second component is formed from a second material that is different from the first material;
a sealant disposed between and along the first flange and the second flange such that the first component is sealingly mated to the second component;
a wire disposed within the sealant, wherein the wire is configured for unsealing the second component from the first component;
wherein the wire is disposed along a perimeter of the second flange and has:
a first end including an anchor; and
a second end spaced opposite the first end and including a handle configured for pulling the wire through the sealant; and
a plurality of fasteners configured for attaching the second flange to the first flange, wherein the second flange and the first flange define a plurality of holes therein each configured for receiving a respective one of the plurality of fasteners;
wherein the anchor is attached to one of the plurality of fasteners, and further wherein the wire is disposed adjacent to the plurality of fasteners along the second flange;
wherein the second flange has an inner edge and an outer edge spaced apart from the inner edge such that each of the plurality of fasteners is disposed between the inner edge and the outer edge, and further wherein the wire at least partially surrounds each of the plurality of fasteners and is disposed between the outer edge and each of the plurality of fasteners.

7. The sealed assembly of claim 2, wherein the sealant is severable by the wire so that the first component unseals from the second component.

8. The sealed assembly of claim 7, wherein the wire severs the sealant so that each of the first flange and the second flange is not damaged.

9. The sealed assembly of claim 7, wherein the second component is re-matable to the first component after the wire severs the sealant.

10. The sealed assembly of claim 2, wherein the wire spaces the first component apart from the second component.

11. A sealed assembly comprising:
 a first component having a first flange, wherein the first component is formed from a first material;
 a second component having a second flange matable with the first flange, wherein the second flange has an inner edge and an outer edge spaced apart from the inner edge, and further wherein the second component is formed from a second material that is different from the first material;
 a room-temperature vulcanized sealant disposed between and along the first flange and the second flange such that the first component is sealingly mated to the second component;
 a wire disposed within the room-temperature vulcanized sealant along an entire perimeter of the second flange and including a handle configured for pulling the wire through the room-temperature vulcanized sealant and extending from the second flange past the outer edge, wherein the wire spaces the first component apart from the second component and is configured for unsealing the second component from the first component; and
 a plurality of fasteners configured for attaching the second flange to the first flange and disposed between the inner edge and the outer edge;
 wherein the wire at least partially surrounds each of the plurality of fasteners and is disposed between the outer edge and each of the plurality of fasteners; and
 wherein the room-temperature vulcanized sealant is severable by the wire so that the first component unseals from the second component.

12. The sealed assembly of claim 11, wherein a thickness of the wire is from about 0.3 mm to about 0.7 mm, and further wherein the wire is bent to have a shape congruent with the second flange.

* * * * *